(12) United States Patent
Maiya et al.

(10) Patent No.: US 11,717,790 B2
(45) Date of Patent: Aug. 8, 2023

(54) SYSTEM FOR FILTRATION AND ASSOCIATED METHOD

(71) Applicant: Cytiva Sweden AB, Uppsala (SE)

(72) Inventors: Nityananda Maiya, Karnataka (IN); Deepak Aravind, Karnataka (IN); Fredrik Lundström, Uppsala (SE); Saameera Simha Hindupur, Karnataka (IN); Shivakumar Selvaraj, Karnataka (IN); Alagur Sahebagouda, Karnataka (IN)

(73) Assignee: CYTIVA SWEDEN AB, Uppsala (SE)

( * ) Notice: Subject to any disclaimer, the term of this patent is extended or adjusted under 35 U.S.C. 154(b) by 0 days.

(21) Appl. No.: 17/252,358

(22) PCT Filed: Jun. 20, 2019

(86) PCT No.: PCT/EP2019/066416
§ 371 (c)(1),
(2) Date: Dec. 15, 2020

(87) PCT Pub. No.: WO2019/243552
PCT Pub. Date: Dec. 26, 2019

(65) Prior Publication Data
US 2021/0260530 A1 Aug. 26, 2021

(30) Foreign Application Priority Data
Jun. 21, 2018 (IN) .............................. 201841023145

(51) Int. Cl.
*B01D 61/12* (2006.01)
*B01D 61/22* (2006.01)
*B01D 65/02* (2006.01)

(52) U.S. Cl.
CPC ............. *B01D 61/12* (2013.01); *B01D 61/22* (2013.01); *B01D 65/02* (2013.01);
(Continued)

(58) Field of Classification Search
CPC ........ B01D 61/12; B01D 61/22; B01D 65/02; B01D 2311/04; B01D 2311/06;
(Continued)

(56) References Cited

U.S. PATENT DOCUMENTS

2005/0197496 A1 9/2005 Perreault
2011/0240557 A1 10/2011 Goodfellow
(Continued)

FOREIGN PATENT DOCUMENTS

CN 104968421 A 10/2015
EP 2730330 A1 5/2014
(Continued)

OTHER PUBLICATIONS

H. Jang et al. / Desalination and Water Treatment 101 (2018) 24-30. (Year: 2018).*
PCT International Search Report and Written Opinion for PCT/EP2019/066416 dated Aug. 30, 2019 (9 pages).
Chinese Office Action for CN Application No. 201980041002.6 dated Sep. 28, 2022 (14 pages, with English translation).
Office Action Issued in Japanese Patent Application No. 2020-570790, dated Jan. 30, 2023, with English Summary (9 Pages).

*Primary Examiner* — Pranav N Patel
(74) *Attorney, Agent, or Firm* — Eversheds Sutherland (US) LLP

(57) ABSTRACT

A method includes measuring, by a flow sensor (70), a flow rate of a permeate fluid (48) flowing through a filter (20) of a membrane filtration system (12). Further, the method includes receiving, by a control unit (86), the measured flow rate of the permeate fluid (48) and determining, by the control unit (86), a first flux rate of the filter (20) based on the measured flow rate of the permeate fluid (48). Furthermore, the method includes comparing, by the control unit (86), the determined first flux rate with a first predetermined flux rate. Additionally, the method includes operating the membrane filtration system (12), by the control unit (86), in a normal mode or a flux tolerant mode based on the comparison of the determined first flux rate with the first predetermined flux rate. The flux tolerant mode of the
(Continued)

membrane filtration system (12) is further based on a determined normalized water permeability value of the filter (20).

11 Claims, 3 Drawing Sheets

(52) U.S. Cl.
CPC ...... *B01D 2311/04* (2013.01); *B01D 2311/06* (2013.01); *B01D 2311/14* (2013.01); *B01D 2311/16* (2013.01); *B01D 2313/48* (2013.01); *B01D 2315/10* (2013.01); *B01D 2315/20* (2013.01); *B01D 2321/40* (2013.01)

(58) Field of Classification Search
CPC ............ B01D 2311/14; B01D 2311/16; B01D 2313/48; B01D 2315/10; B01D 2315/20; B01D 2321/40; B01D 61/08; B01D 61/18; B01D 2311/08; B01D 2321/04; B01D 2321/12; B01D 2321/14; B01D 2321/02; B01D 2321/10; B01D 2321/2083

See application file for complete search history.

(56) References Cited

U.S. PATENT DOCUMENTS

| | | | |
|---|---|---|---|
| 2012/0125846 A1* | 5/2012 | Suzumura | C02F 1/444 210/96.2 |
| 2012/0294836 A1 | 11/2012 | Rowley et al. | |
| 2014/0326665 A1* | 11/2014 | Feldstein | C02F 1/008 210/652 |
| 2015/0306544 A1* | 10/2015 | Park | C02F 1/001 210/636 |
| 2016/0046503 A1 | 2/2016 | Hoek et al. | |

FOREIGN PATENT DOCUMENTS

| | | |
|---|---|---|
| JP | 2007526302 A | 9/2007 |
| JP | 2017525563 A | 9/2017 |
| NO | 2016025590 A1 | 2/2016 |
| WO | 2005091801 A2 | 10/2005 |
| WO | 2015/175679 A2 | 11/2015 |
| WO | 2016/074763 A1 | 5/2016 |

* cited by examiner

SYSTEM FOR FILTRATION AND ASSOCIATED METHOD

CROSS REFERENCE TO RELATED APPLICATIONS

This application claims the priority benefit of PCT/EP2019/066416, filed on Jun. 20, 2019, which claims the benefit of Indian Application No. 201841023145, filed on Jun. 21, 2018, the entire contents of which are incorporated by reference herein.

FIELD OF INVENTION

The embodiments of the present specification relate generally to membrane filtration systems, and more particularly, to a system and method for monitoring health of a filter of a membrane filtration system.

BACKGROUND OF INVENTION

Existence of many substances as solutions or mixtures created a need for processes to be developed to separate the solutions or mixtures. The need to purify, recover, isolate, and remove substances in process streams in chemical, pharmaceutical, food, petroleum, healthcare, and waste water applications has driven the need for separation technology. In recent years, membrane-based filtration has gained importance in many separation applications.

The most common membrane filtration processes are microfiltration (MF), ultrafiltration (UF), and reverse osmosis (RO). The membrane filtration processes are pressure driven and are used for separation of macromolecules from a fluid using a membrane filter. For small transmembrane pressures of a membrane of the filter, membrane flux is proportional to fluid pressure. The term "membrane flux" refers to flow rate of a medium per unit area of a membrane of the filter. The membrane filter serves as a selective barrier by permitting certain constituents of a mixture to pass-through while retaining other constituents of the mixture. The filtration process results in two phases, permeate and retentate phases.

A drawback associated with use of membrane separation process is a phenomenon known as fouling of the membrane filter. Fouling is the deposition of material, referred to as foulant, on a surface of the membrane or pores of the membrane, leading to a change in membrane performance or even complete plugging of the membrane. As a result, filter efficiency reduces due to the filter clogging, which in turn impacts filtration quality and increases overall processing time.

There is a need for constant monitoring of health of a membrane filter to enable optimal and efficient use of the membrane filter.

BRIEF DESCRIPTION OF INVENTION

In accordance with one aspect of the present specification, a method is disclosed. The method includes measuring, by a flow sensor, a flow rate of a permeate fluid flowing through a filter of a membrane filtration system. Further, the method includes receiving, by a control unit, the measured flow rate of the permeate fluid and determining, by the control unit, a first flux rate of the filter based on the measured flow rate of the permeate fluid. Furthermore, the method includes comparing, by the control unit, the determined first flux rate with a first predetermined flux rate. Additionally, the method includes operating the membrane filtration system, by the control unit, in a normal mode or a flux tolerant mode based on the comparison of the determined first flux rate with the first predetermined flux rate. The flux tolerant mode of the membrane filtration system is further based on a determined normalized water permeability value of the filter.

In accordance with another aspect of the present specification, a system is disclosed. The system includes a membrane filtration system having a filter and a control system coupled to the membrane filtration system. The control system includes a flow sensor coupled to the membrane filtration system and configured to measure a flow rate of a permeate fluid flowing through the filter and a control unit communicatively coupled to the flow sensor. The control unit is configured to receive the measured flow rate of the permeate fluid and determine a first flux rate of the filter based on the measured flow rate of the permeate fluid. The control unit is further configured to compare the determined first flux rate with a first predetermined flux rate. Further, the control unit is configured to operate the membrane filtration system in a normal mode or a flux tolerant mode based on the comparison of the determined first flux rate with the first predetermined flux rate. The flux tolerant mode of the filtration system is further based on a determined normalized water permeability value of the filter.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising", or "having" and variations thereof herein are meant to encompass the items listed thereafter and equivalents thereof as well as additional items. The terms "communicatively coupled" and "coupled" are not restricted to physical or mechanical connections or couplings, and can include electrical connections or wireless couplings, whether direct or indirect.

In accordance with an embodiment of the present specification, a system having a membrane filtration system and a control system is disclosed. The control system includes a flow sensor coupled to the membrane filtration system and configured to measure a flow rate of a permeate fluid flowing through a filter of the membrane filtration system. The control system further includes a control unit communicatively coupled to the flow sensor. The control unit is configured to receive the measured flow rate of the permeate fluid, determine a first flux rate of the filter based on the measured flow rate of the permeate fluid, and compare the determined first flux rate with a first predetermined flux rate. The control unit is further configured to operate the membrane filtration system in a normal mode or a flux tolerant mode based on the comparison of the determined first flux rate with the first predetermined flux rate. The flux tolerant mode of the membrane filtration system is further based on a determined Normalized Water Permeability (NWP) value of the filter. In accordance with another embodiment, a method of operating the membrane filtration system is disclosed. In accordance with the embodiments of the present specification, the exemplary control system enables monitoring of life of the filter of the membrane filtration system and facilitates optimizing usage of the filter over repeated cycles of operation of the membrane filtration system based on the determined first flux rates and NWP values of the filter.

Figure 1:
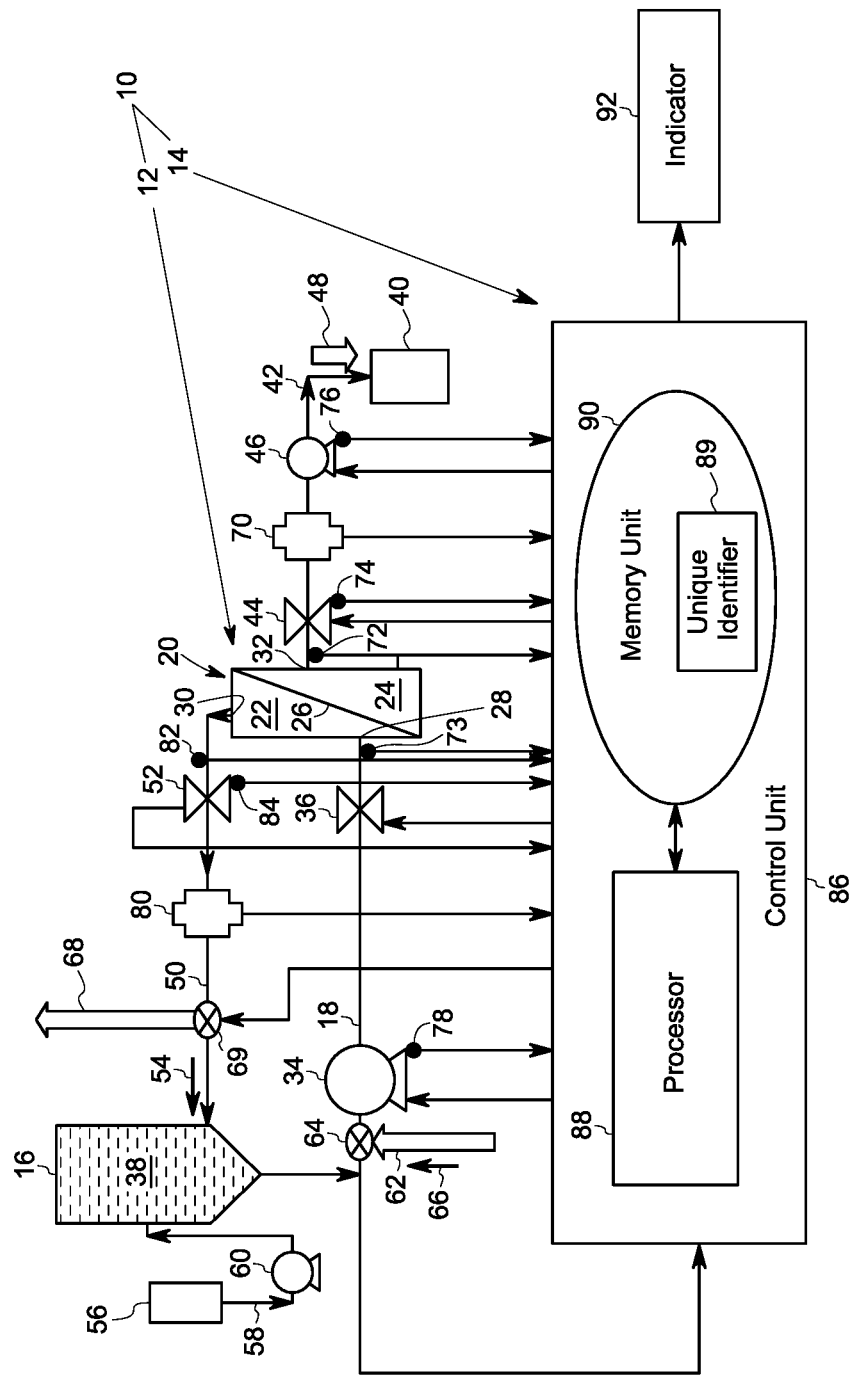
FIG. 1 is a schematic representation of a system having a membrane filtration system and a control system coupled to the membrane filtration system in accordance with an embodiment of the present specification.

Referring to FIG. 1, a schematic representation of a system 10 having a membrane filtration system 12 and a control system 14 coupled to the membrane filtration system 12 in accordance with an embodiment of the present specification is shown. In the illustrated embodiment, the membrane filtration system 12 includes a reservoir 16 coupled via a feed flow path 18 to a filter (i.e. membrane filter) 20. The filter 20 has an inlet portion 22 and an outlet portion 24 separated by a membrane 26. The inlet portion 24 has an inlet 28 and a first outlet 30. The outlet portion 24 has a second outlet 32.

The membrane filtration system 12 further includes a feed pump 34 and a feed control valve 36 coupled to the feed flow path 18. The feed pump 34 is located upstream of the feed control valve 36. The reservoir 16 is used for storage of a feed fluid 38 temporarily. Specifically, the feed pump 34 is used for feeding the feed fluid 38 at a predetermined pressure from the reservoir 16 to the inlet 28 of the filter 20 via the feed flow path 18. The feed control valve 36 is used for permitting or stopping a flow of the feed fluid 38 via the feed flow path 18.

Additionally, the membrane filtration system 12 includes a collection tank 40 coupled to the second outlet 32 via a permeate flow path 42. The membrane filtration system 12 also includes a first pressure control valve 44 and a permeate pump 46 coupled to the permeate flow path 42. The permeate pump 46 is located downstream of the first pressure control valve 44. The filter 20 is used for separating a permeate fluid 48 from the feed fluid 38 by utilizing a pressure difference across the filter 20. The first pressure control valve 44 is used for controlling a pressure of the permeate fluid 48 flowing through the permeate flow path 42 via the second outlet 32 of the filter 20. Specifically, an amount of opening of the first pressure control valve 44 can be controlled for controlling the pressure of the permeate fluid 48 flowing through the permeate flow path 42 via the second outlet 31 of the filter 20. The permeate pump 46 is used to feed the permeate fluid 48 at a predetermined pressure to the collection tank 40 via the permeate flow path 42.

Further, the reservoir 16 is coupled to the first outlet 30 of the filter 20 via a retentate flow path 50. The membrane filtration system 12 also includes a second pressure control valve 52 coupled to the retentate flow path 50. The second pressure control valve 44 is used for controlling a pressure of a retentate fluid 54 flowing through the retentate flow path 50 via the first outlet 30 of the filter 20. The retentate fluid 54 is a remaining portion of the feed fluid 38 after separation of the permeate fluid 48. The retentate fluid 54 is fed via the retentate flow path 50 to the reservoir 16. Specifically, an amount of opening of the second pressure control valve 44 is controlled for controlling the pressure of the retentate fluid 54 flowing through the retentate flow path 50 via the first outlet 30 of the filter 20. Furthermore, a source 56 is coupled via a flow path 58 to the reservoir 16. The source 56 is used for storage of the feed fluid 38. A transfer pump 60 is coupled to the flow path 58 and used to transfer the feed fluid 38 from the source 56 to the reservoir 16 via the flow path 58. Whenever there is a requirement, the transfer pump 60 is operated to replenish the reservoir 16 with additional feed fluid 38.

Additionally, the membrane filtration system 12 includes a water source (not shown) coupled to a portion of the feed flow path 18 upstream of the feed pump 34 via an inlet path 62. The inlet path 62 is coupled to the portion of the feed flow path 18 via a control valve 64. The control valve 64 is used to permit flow of either the feed fluid 38 or water 66 through the feed flow path 18. A drain tank (not shown) is coupled via an outlet path 68 to a portion of the retentate flow path 50 downstream of the second pressure control valve 52. The outlet path 68 is coupled to the portion of the retentate flow path 50 via a control valve 69. In one instance, the control valve 69 is used to direct the water 66 to the drain tank via the retentate flow path 50. In another instance, the control valve 66 is used to direct the retentate fluid 54 to the reservoir 16. It should be noted herein that the illustrated membrane filtration system 12 is an exemplary embodiment and should not be construed as a limitation. The configuration f the membrane filtration system 12 may vary depending upon the application.

In the illustrated embodiment, the control system 14 includes a flow sensor 70 and a first pressure sensor 72 coupled to the permeate flow path 42. The flow sensor 70 is located downstream of the first pressure control valve 44 and upstream of the permeate pump 46. The first pressure sensor 72 is located upstream of the first pressure control valve 44. The flow sensor 70 is used to measure a flow rate of the permeate fluid 48 flowing through the filter 20 to the permeate flow path 42. In one embodiment, the flow sensor 70 may output a signal representative of the flow rate of the permeate fluid 48 flowing through the permeate flow path 42. In another embodiment, the flow senor 70 may output a signal representative of a parameter, for example, volume or velocity, of the permeate fluid 48 for computing the flow rate of the permeate fluid 48. Any type of flow sensor which may be used for measuring the flow rate of the permeate fluid 48 is envisioned. The first pressure sensor 72 is used to sense a pressure of the permeate fluid 48 flowing through the permeate flow path 42. The control system 14 further includes a first actuation sensor 74 coupled to the first pressure control valve 44 and a first speed sensor 76 coupled to the permeate pump 46. The first actuation sensor 74 is used to measure an actuation state of the first pressure control valve 44 and the first speed sensor 76 is used to measure a speed of the permeate pump 46.

The control system 14 further includes a second pressure sensor 73 coupled to the feed flow path 18 and a second speed sensor 78 coupled to the feed pump 34. The second pressure sensor 73 is located downstream of the feed control valve 36. The second pressure sensor 72 is used to sense a pressure of the feed fluid 38 flowing through the feed flow path 18. The second speed sensor 78 is used to measure a speed of the feed pump 34.

The control system 14 additionally includes another flow sensor 80 and a third pressure sensor 82 coupled to the retentate flow path 50. The flow sensor 80 is located downstream of the second pressure control valve 52. The third pressure sensor 82 is located upstream of the second pressure control valve 52. The flow sensor 80 is used to measure a flow rate of the retentate fluid 54 flowing through the retentate flow path 50. In one embodiment, the flow sensor 80 may output a signal representative of the flow rate of the retentate fluid 54 flowing through the retentate flow path 50. In another embodiment, the flow senor 80 may output a signal representative of a parameter, for example, volume or velocity, of the retentate fluid 54 for computing the flow rate of the retentate fluid 54. Any type of flow sensor which may be used for measuring the flow rate of the retentate fluid 54 is envisioned. The third pressure sensor 82 is used to sense a pressure of the retentate fluid 54 flowing through the retentate flow path 50. The control system 14 further includes a second actuation sensor 84 coupled to the second pressure control valve 52. The second actuation sensor 84 is used to measure an actuation state of the second pressure control valve 52.

Further, in the illustrated embodiment, the control system 14 includes a control unit 86 having a processor 88 and a memory unit 90 coupled to the processor 88. In some embodiments, the control unit 86 may is used to control one or more functions of the membrane filtration system 12. In certain embodiments, the control unit 86 may include more than one processor co-operatively working with each other for performing intended functionalities. The control unit 86 is further configured to store and retrieve contents into and from the memory unit 90. In one embodiment, the control unit 86 is configured to initiate and control the functionality of the membrane filtration system 12.

In one embodiment, the control unit 86 includes at least one of a general-purpose computer, a graphics processing unit (GPU), a digital signal processor, and a controller. In other embodiments, the control unit 86 includes a customized processor element such as, but not limited to, an application-specific integrated circuit (ASIC) and a field-programmable gate array (FPGA). In some embodiments, the control unit 86 may be communicatively coupled with at least one of a keyboard, a mouse, and any other input device and configured to receive commands and/or parameters from an operator via a console.

In one embodiment, the memory unit 90 is a random-access memory (RAM), a read only memory (ROM), a flash memory, or any other type of computer readable memory accessible by the processor 88. Also, in certain embodiments, the memory unit 90 may be a non-transitory computer readable medium encoded with a program having a plurality of instructions to instruct the processor 88 to perform a sequence of steps to operate the membrane filtration system 12. In one embodiment, the memory unit 90 is configured to store a unique identifier 89 associated with operational information of the filter 20.

In the illustrated embodiment, the control unit 86 is communicatively coupled to the flow sensors 70, 80. In one embodiment, the control unit 86 is configured to receive the output signal representative of the flow rate of the permeate fluid 48 from the flow sensor 70. In another embodiment, the control unit 86 is configured to receive the output signal representative of a parameter, for example, volume or velocity, of the permeate fluid 48 from the flow sensor 70 for computing the flow rate of the permeate fluid 48 in accordance with a known technique. The control unit 86 is configured to determine a first flux rate of the filter 20 based on the measured flow rate of the permeate fluid 48. It should be noted herein that the first flux rate of the filter 20 is defined as the measured flow rate of the permeate fluid 48 per unit area of the filter 20. The control unit 86 is further configured to compare the determined first flux rate of the filter 20 with a first predetermined flux rate and operate the membrane filtration system 12 in a normal mode or a flux tolerant mode based on the comparison of the determined first flux rate with the first predetermined flux rate.

In one embodiment, the control unit 86 is configured to operate the membrane filtration system 12 in the normal mode by controlling at least one operational parameter of the membrane filtration system 12, if the determined first flux rate is less than the first predetermined flux rate. The at least one operational parameter includes a speed of the permeate pump 46, a speed of the feed pump 34, an actuation of the first pressure control valve 44, and an actuation of the second pressure control valve 52. Further, the control unit 86 is configured to operate the membrane filtration system 12 in the flux tolerant mode, if the determined first flux rate is less than the first predetermined flux rate after controlling the at least one operational parameter of the membrane filtration system 12. The flux tolerant mode of the membrane filtration system 12 is further based on a determined NWP value of the filter 20. The NWP value of the filter 20 is determined based on a predefined flux of the filter 20 and a determined Trans Membrane Pressure (TMP) of the filter 20. Aspects such as the normal mode of operation, the flux tolerant mode of operation, and determination of the TMP are explained in detail with reference to a subsequent figure.

The control unit 86 is also coupled to the feed pump 34 and the permeate pump 46 and configured to control speeds of the feed pump 34 and the permeate pump 46. The control unit 86 is further communicatively coupled to the first speed sensor 76 and the second speed sensor 78 and configured to receive output signals representative of speeds of the permeate pump 46 and the feed pump 34 respectively.

The control unit 86 is further coupled to the feed control valve 36, the first pressure control valve 44, and the second pressure control valve 52 and configured to control the actuations of the feed control valve 36, the first pressure control valve 44, and the second pressure control valve 52. The control unit 86 is also communicatively coupled to the first actuation sensor 74 and the second actuation sensor 84 and configured to receive output signals representative of actuation states of the first pressure control valve 44 and the second pressure control valve 84.

Additionally, the control unit 86 is communicatively coupled to the first pressure sensor 72, the second pressure sensor 73, and the third pressure sensor 82. The control unit 86 is communicatively coupled to the first, second, and third pressure sensors 72, 73, 82 and configured to determine a TMP of the filter 20 based on outputs from the first, second, and third pressure sensors 72, 73, 82. Furthermore, the control unit 86 is communicatively coupled to the control valves 64, 66 and configured to control the valves 64, 66 to permit or stop water flow through the membrane filtration system 12.

Furthermore, the control unit 86 is coupled to an indicator 92. The control unit 86 activates the indicator 92 to indicate a replacement of the filter 20 based on a comparison of the determined NWP value of the filter 20 with a predetermined base value of the filter 20. The indicator 92 may be an audio based indictor or a visual based indicator or a combination thereof.

Figure 2:
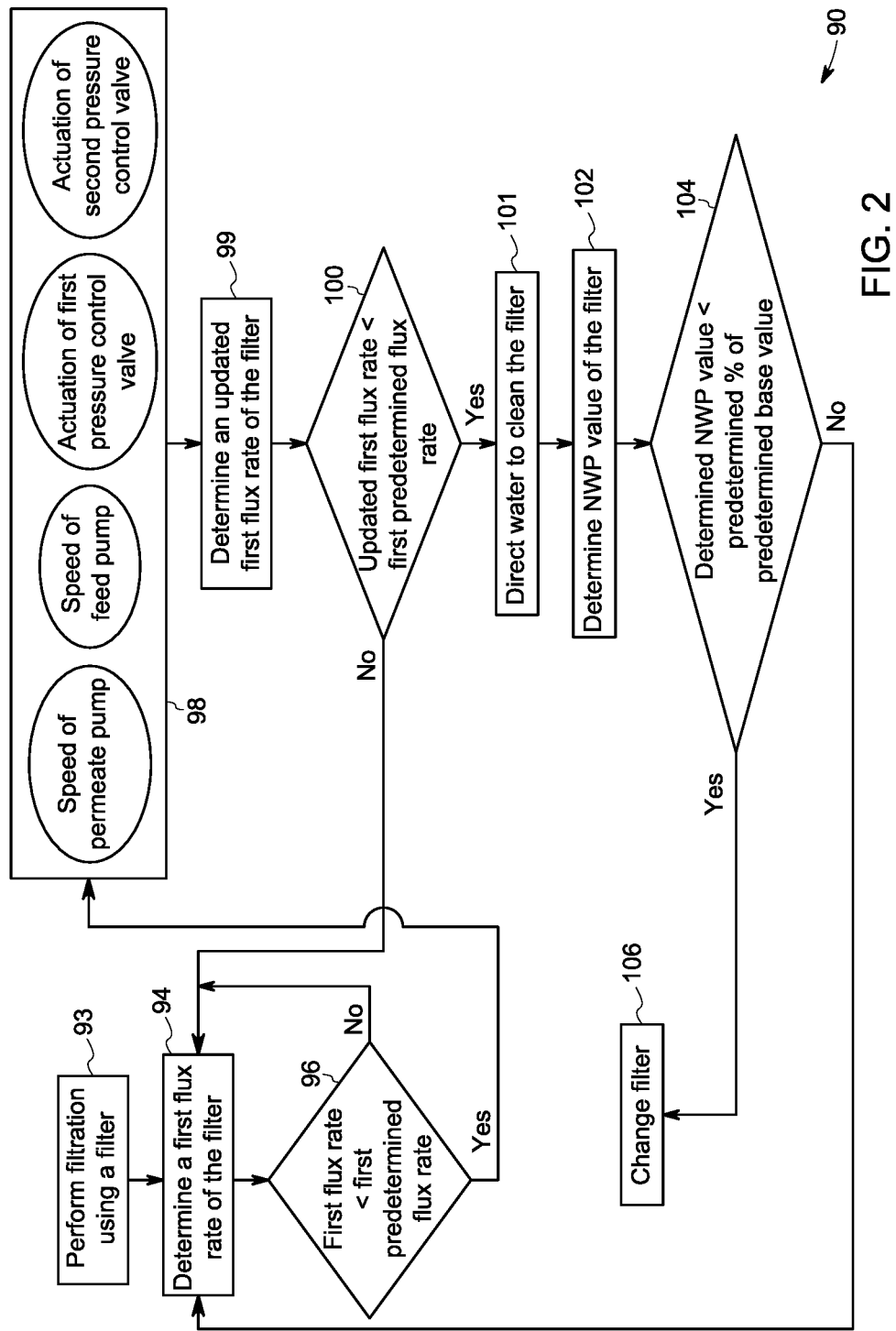
FIG. 2 is a flow chart illustrating a method of operating the system in accordance with the embodiment of FIG. 1.

Referring to FIG. 2, a flow chart illustrating a method 90 of operating the system 10 in accordance with the embodiment of FIG. 1. At step 93, during a cycle of operation of the system 10, the feed fluid 38 is fed by the feed pump 34 from the reservoir 16 to the inlet 28 of the filter 20 via the feed flow path 18. The filter 20 separates the permeate fluid 48 from the feed fluid 38 by utilizing a pressure difference across the filter 20. The permeate pump 46 feeds the permeate fluid 48 at a predetermined pressure to the collection tank 40 via the permeate flow path 42. The retentate fluid 54 is fed via the retentate flow path 50 to the reservoir 16. Whenever there is a requirement, the transfer pump 60 is operated to replenish the reservoir 16 with additional feed fluid 38. The cycle is repeated. In one embodiment, the feed fluid 38 includes cell culture media and cell debris and the permeate fluid 48 includes metabolites. In another embodiment, the feed fluid 38 includes protein solution and the permeate fluid 48 includes salt solution.

In one embodiment, the control unit 86 receives the output signal representative of the flow rate of the permeate fluid 48 from the flow sensor 70. In another embodiment, the control unit 86 receives the output signal representative of a parameter, for example, volume or velocity, of the permeate fluid 48 from the flow sensor 70 and computes the flow rate of the permeate fluid 48 in accordance with a known technique. At step 94, the control unit 86 determines a first flux rate of the filter 20 based on the measured flow rate of the permeate fluid 48. As noted earlier, the first flux rate of the filter 20 is defined as the measured flow rate of the permeate fluid 48 per unit area of the filter 20. At step 96, the control unit 86 compares the determined first flux rate of the filter 20 with a first predetermined flux rate. In one embodiment, the first predetermined flux rate is for example, 70% of a predefined flux rate. If the determined first flux rate is less than the first predetermined flux rate, the membrane filtration system 12 is operated in the normal mode at step 98. If the determined first flux rate is greater than or equal to the first predetermined flux rate, the step 94 is again repeated.

The membrane filtration system 12 is operated in the normal mode by controlling at least one operational parameter of the membrane filtration system 12. In one embodiment, the at least one operational parameter includes a speed of the permeate pump 46, a speed of the feed pump 34, an actuation of the first pressure control valve 44 of the permeate flow path 42, and an actuation of the second pressure control valve 52 of the retentate flow path 50. The control unit 86 controls the speed of the permeate pump 46 and the actuation of the first pressure control valve 44 based on outputs from the first speed sensor 76 and the first actuation sensor 74 respectively. Further, the control unit 86 controls the actuation of the second pressure control valve 52 and the speed of the feed pump 34 based on outputs of the second actuation sensor 84 and the second speed sensor 78 respectively.

In one embodiment, the control unit 86 controls the speed of the permeate pump 46, the speed of the feed pump 34, the actuation of the first pressure control valve 44 of the permeate flow path 42, and the actuation of the second pressure control valve 52 of the retentate flow path 50 in a predefined sequence at predetermined time instances and for predetermined durations. The predefined sequence, the predetermined time instances, and predetermined durations are set based on the factors such as the determined first flux rate and the first predetermined flux rate. In one embodiment, the predefined sequence involves increasing the speed of the permeate pump 46, decreasing the speed of the permeate pump 46, regulating the second pressure control valve 52, and increasing the speed of the feed pump 34 sequence at predetermined time instances and for predetermined durations. It should be noted herein that the predefined sequences, predetermined time instances, and predetermined durations may vary depending on the application.

After controlling at least one operational parameter of the membrane filtration system 12, the control unit 86 again receives the output signal representative of the flow rate of the permeate fluid 48 from the flow sensor 70. Again, the control unit 86 determines an updated first flux rate of the filter 20 based on the measured flow rate of the permeate fluid 48 at step 99. Then, the control unit 86 compares the determined updated first flux rate of the filter 20 with the first predetermined flux rate at step 100. If the determined updated first flux rate of the filter 20 is greater than or equal to the first predetermined flux rate, the step 94 is again repeated. If the determined updated first flux rate is less than the first predetermined flux rate after controlling the at least one operational parameter of the membrane filtration system 12, the membrane filtration system 12 is operated in the flux tolerant mode. In the flux tolerant mode, the control unit 86 controls the control valve 64 to direct the water 66 via the inlet path 62, the feed flow path 18, and the filter 20 to clean the filter 20 at step 101. Furthermore, the control unit 86 controls the control valve 69 to direct the water exiting the filter 20 via the retentate flow path 50 and the outlet path 68. During the cleaning of the filter 20, the control valve 64 is used to prevent flow of the feed fluid 38 through the feed flow path 18. Also, the control valve 69 is used to prevent flow of the water 66 to the reservoir 16.

As noted earlier, the flux tolerant mode of the membrane filtration system 12 is further based on the determined NWP value of the filter 20. At step 102, the NWP value of the filter 20 is determined by the control unit 86 based on the predefined flux of the filter 20 and the determined TMP of the filter 20. Specifically, the NWP value is calculated by the following relation:

$$NWP = Flux/TMP$$

where flux is a predefined flux provided by the manufacturer of the filter 20, TMP is calculated by the following relation:

$$TMP = ((p_2+p_3)/2) - p_1$$

where $p_1$ is an output of the first pressure sensor 72, $p_2$ is an output of the second pressure sensor 78, $p_3$ is an output of the third pressure sensor 82.

Thereafter, at step 104, the control unit 86 compares the determined NWP value of the filter 20 with a predetermined base value of the filter 20. At step 106, the control unit 86 activates the indicator 92 to indicate a replacement of the filter 20, if the determined NWP value of the filter 20 is less than a predetermined percentage of the predetermined base value of the filter 20. For example, if the determined NWP value of the filter 20 is less than 50% of the predetermined base value of the filter 20, the control unit 86 activates the indicator 92. As noted earlier, the indicator 92 may be an audio based indicator or a visual based indicator or a combination thereof. If the determined NWP value of the filter 20 is greater than or equal to the predetermined percentage of the predetermined base value of the filter 20, the steps of 94-102 are repeated until the determined NWP value of the filter 20 is less than the predetermined percentage of the predetermined base value of the filter 20. In such an embodiment, the first predetermined flux rate is reset to a second predetermined flux rate which is less than the first predetermined flux rate. In one embodiment, the memory unit 90 stores the unique identifier 89 associated with operational information of the filter 20. The operational information of the filter 20 may include but not limited to a type of membrane filtration system, a type of feed fluid, type of permeate fluid, a type of retentate fluid, number of cycles of operation, first flux rate, first predetermined flux rate, speeds of the feed pump 34 and the permeate pump 46, actuation of the first and second pressure control valves 44, 52, NWP values, predefine flux, transmembrane pressure, and the like.

In accordance with the embodiments of the present specification, the exemplary control system 14 enables constant monitoring of health of the filter 20 to enable optimal and efficient use of the filter 20. Specifically, the control system 14 enables automated assessment of life of the filter 20 by continuously monitoring flux rates and NWP values of the filter 20 over repeated cycles of operation. The control system 14 determines whether to operate the membrane filtration system 12 in the normal mode or the flux tolerant mode based on the sensed flux rates. The predefined values of flux rates may be reset over repeated cycles.

Figure 3:
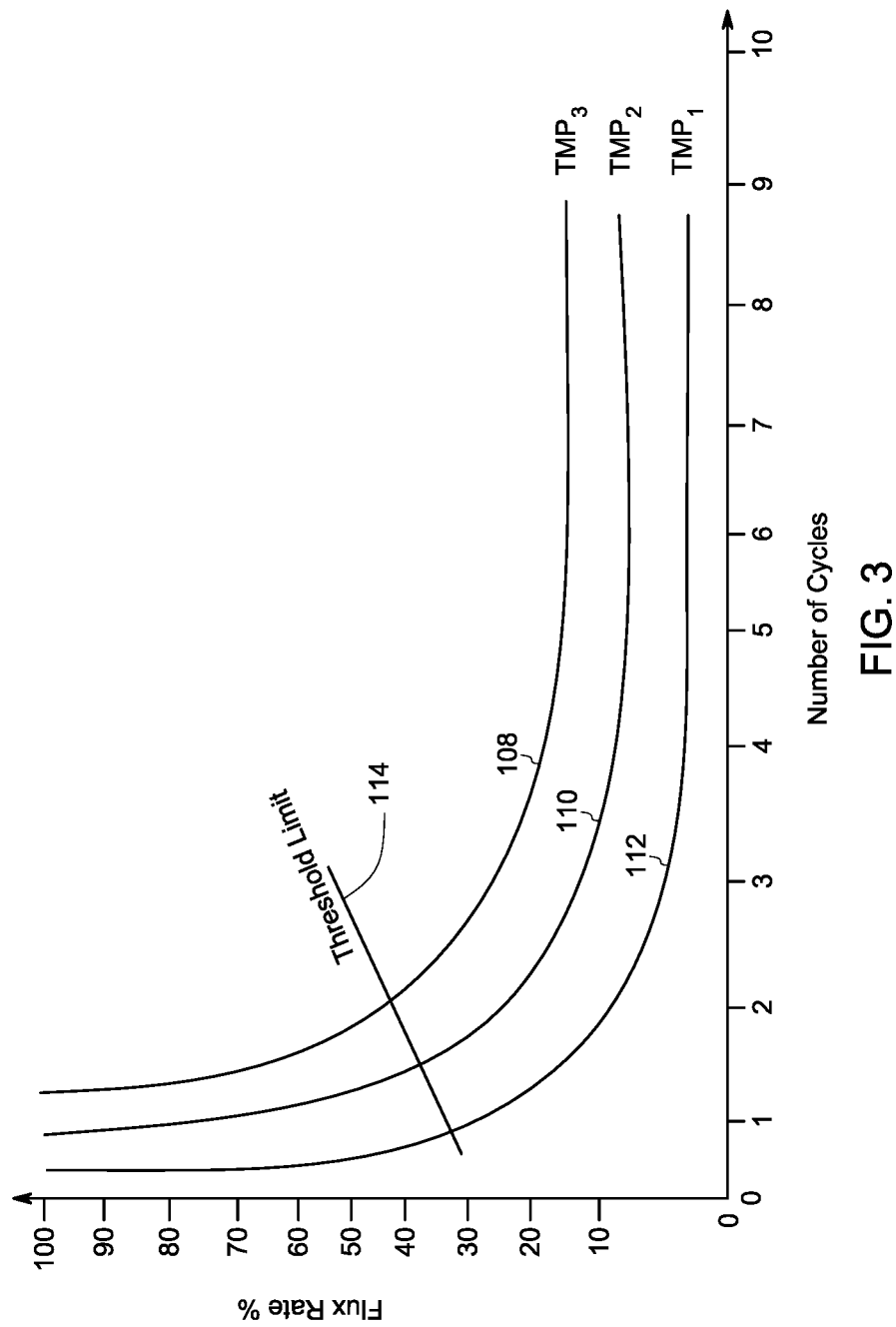
FIG. 3 is a graphical representation illustrating a variation of a flux rate percentage of a filter of a membrane filtration system with respect to number of cycles of operation of the membrane filtration system in accordance with embodiments of the present specification.

Referring to FIG. 3, a graphical representation illustrating a variation of a flux rate percentage of a filter of a membrane filtration system with respect to number of cycles of operation of the membrane filtration system in accordance with embodiments of the present specification. X-axis is representative of number of cycles of operation of the filter and Y-axis is representative of flux rate percentage of the filter. Curve 108 is representative of variation of a first flux rate percentage of the filter corresponding to a first transmembrane pressure (TMP1). Curve 110 is representative of variation of a second flux rate percentage of the filter corresponding to a second transmembrane pressure (TMP2). Curve 112 is representative of variation of a third flux rate percentage of the filter corresponding to a third transmembrane pressure (TMP3). The line 114 is indicative of a predetermined percentage flux rate (threshold limit). When the filter is operated over a number of cycles, the predetermined percentage flux rate is reset corresponding to the change in transmembrane pressure. For example, with reference to curve 108, the predetermined percentage flux rate is 40%, with reference to curve 110, the predetermined percentage flux rate is 35%, and with reference to curve 112, the predetermined percentage flux rate is 30%.

In accordance with the embodiments of the present invention, the control system enables assessment of life of the filter based on the flux rates and NWP values. The control system enables constant monitoring of health of the filter, thereby enabling optimal filter usage and efficient filtration process.

While only certain features of the specification have been illustrated and described herein, many modifications and changes will occur to those skilled in the art. It is, therefore, to be understood that the appended claims are intended to cover all such modifications and changes as fall within the true spirit of the specification.

We claim:

1. A method of operation of a system comprising a membrane filtration system, the method comprising:
   measuring, by a flow sensor, a flow rate of a permeate fluid flowing through a filter of the membrane filtration system;
   receiving, by a control unit, a signal indicative of the measured flow rate of the permeate fluid;
   determining, by the control unit, a first flux rate of the filter based on the measured flow rate signal of the permeate fluid;
   comparing, by the control unit, the first flux rate with a first predetermined flux rate;
   operating the membrane filtration system, by the control unit, in a normal filtration mode in response to the first flux rate being greater than or equal to the first predetermined flux rate;
   operating the membrane filtration system, by the control unit, in (i) a modified filtration mode or (ii) a cleaning mode in response to the first flux rate being less than the first predetermined flux rate, wherein the cleaning mode of the membrane filtration system is further based on a determined normalized water permeability value of the filter; and
   resetting the first predetermined flux rate in accordance with a change in transmembrane pressure (TMP) when the filter is operated over a number of cycles until the determined normalized water permeability value of the filter is less than a predetermined percentage of a predetermined base value of the filter.

2. The method as claimed in claim 1, wherein operating the membrane filtration system in the modified filtration mode comprises, by the control unit, changing at least one operational parameter of the membrane filtration system.

3. The method as claimed in claim 2, wherein the at least one operational parameter comprises at least one of a speed of a permeate pump of the membrane filtration system, a speed of a feed pump of the membrane filtration system, an actuation of a first pressure control valve of a permeate flow path of the membrane filtration system, or an actuation of a second pressure control valve of a retentate flow path of the membrane filtration system.

4. The method as claimed in claim 1, comprising operating the membrane filtration system in the cleaning mode after the modified filtration mode in response to the first flux rate remaining less than the first predetermined flux rate after operating the membrane filtration system in the modified filtration mode.

5. The method as claimed in claim 1, wherein operating the membrane filtration system in the cleaning mode comprises directing water through the filter to clean the filter.

6. The method as claimed in claim 5, wherein operating the membrane filtration system in the cleaning mode comprises determining the normalized water permeability value of the filter based on a predefined flux of the filter and a determined transmembrane pressure of the filter.

7. The method as claimed in claim 6, wherein operating the membrane filtration system in the cleaning mode comprises comparing the normalized water permeability value of the filter with a predetermined base value of the filter.

8. The method as claimed in claim 7, wherein operating the membrane filtration system in the cleaning mode comprises activating an indicator to indicate a replacement of the filter in response to the normalized water permeability value of the filter being less than a predetermined percentage of the predetermined base value of the filter.

9. The method as claimed in claim 7, comprising operating the membrane filtration system in the normal filtration mode in response to the normalized water permeability value of the filter being greater than or equal to a predetermined percentage of the predetermined base value of the filter.

10. The method as claimed in claim 9, wherein operating the membrane filtration system in the normal filtration mode comprises resetting the first predetermined flux rate to a second predetermined flux rate less than the first predetermined flux rate.

11. The method as claimed in claim 1, comprising storing, by the control unit, a unique identifier representative of operational information of the filter.

* * * * *